LATCHING DEVICE

Original Filed Nov. 4, 1966 5 Sheets-Sheet 1

INVENTOR
Roland V. Fowler
By Wolfe, Hubbard, Voit & Osann
ATTORNEYS

LATCHING DEVICE

Original Filed Nov. 4, 1966 5 Sheets-Sheet 2

INVENTOR
Roland V. Fowler
By Wolfe, Hubbard, Voit & Osann
ATTORNEYS

LATCHING DEVICE

Original Filed Nov. 4, 1966 5 Sheets-Sheet 3

INVENTOR
Roland V. Fowler
by Wolfe, Hubbard, Voit & Osann
ATTORNEYS

Feb. 22, 1972 R. V. FOWLER Re. 27,291

LATCHING DEVICE

Original Filed Nov. 4, 1966 5 Sheets-Sheet 4

INVENTOR
Roland V. Fowler
By Wolfe, Hubbard, Voit & Osann
ATTORNEYS

LATCHING DEVICE

Original Filed Nov. 4, 1966 5 Sheets-Sheet 5

INVENTOR
Roland V. Fowler
by Wolfe, Hubbard, Voit & Osann
ATTORNEYS

United States Patent Office

Re. 27,291
Reissued Feb. 22, 1972

27,291
LATCHING DEVICE

Roland V. Fowler, Louisville, Ky., assignor to Amerock Corporation, Rockford, Ill.

Original No. 3,410,591, dated Nov. 12, 1968, Ser. No. 592,137, Nov. 4, 1966. Application for reissue Mar. 12, 1970, Ser. No. 18,870
Int. Cl. E05c *5/00, 19/10*
U.S. Cl. 292—113 18 Claims

Matter enclosed in heavy brackets [ ] appears in the original patent but forms no part of this reissue specification; matter printed in italics indicates the additions made by reissue.

ABSTRACT OF THE DISCLOSURE

A latch for a self-cleaning oven and comprising a handle operable to move a bolt along a first path into engagement with a strike on the oven door and then inwardly along a second path to a latched position to draw the door in tightly against the oven cabinet. A spring acting on the bolt normally holds the bolt for movement in its first path and prevents the bolt from moving inwardly to its latched position unless the door is closed and the bolt actually engages the strike to create a force overcoming the spring force.

This invention relates to a latch particularly adapted for use in latching the door of an appliance such as a self-cleaning oven or an automatic dishwasher in tightly closed condition prior to operation of the appliance and includes generally an operating handle for moving a latching bolt first outwardly along a first predetermined path from a retracted position to an extended position to engage a strike and then inwardly along a second predetermined path to a latching position to draw the door into a tightly closed position. The inward or draw-in motion of the bolt along the second path toward the latching position is used to actuate a control switch conditioning the appliance for operation and such motion is blocked when the door is not closed in order to prevent activation of the appliance even though the operating handle should happen to be moved.

The general object of the present invention is to provide a new and improved latch of the foregoing character which is simpler in construction, more effective and trouble-free in operation and, at the same time, has a longer service life than prior latches used for related purposes.

A further object is to block the draw-in motion of the bolt until the latter engages the strike and to utilize the strike for causing the draw-in motion thereby to insure that the bolt cannot be moved inwardly to its latching position when the door is open.

A more detailed object is to provide a novel blocking member normally disposed in an active position to help block inward movement of the bolt and movable to an inactive position to permit such movement in response to engagement of the bolt with the strike.

Still another object is to return the bolt of the foregoing latch to its retracted position automatically after the bolt is moved to its extended position without engaging the strike.

The invention also resides in the novel coaction between the bolt and the blocking member enabling positive latching and sealing of the door in spite of possible misalinement between the bolt and the strike.

Other objects and advantages of the invention will become apparent from the following detailed description taken in connection with the accompanying drawings, in which FIG. 1 is a fragmentary vertical cross-section of an appliance equipped with a latch embodying the novel features of the present invention.

Figure 8:
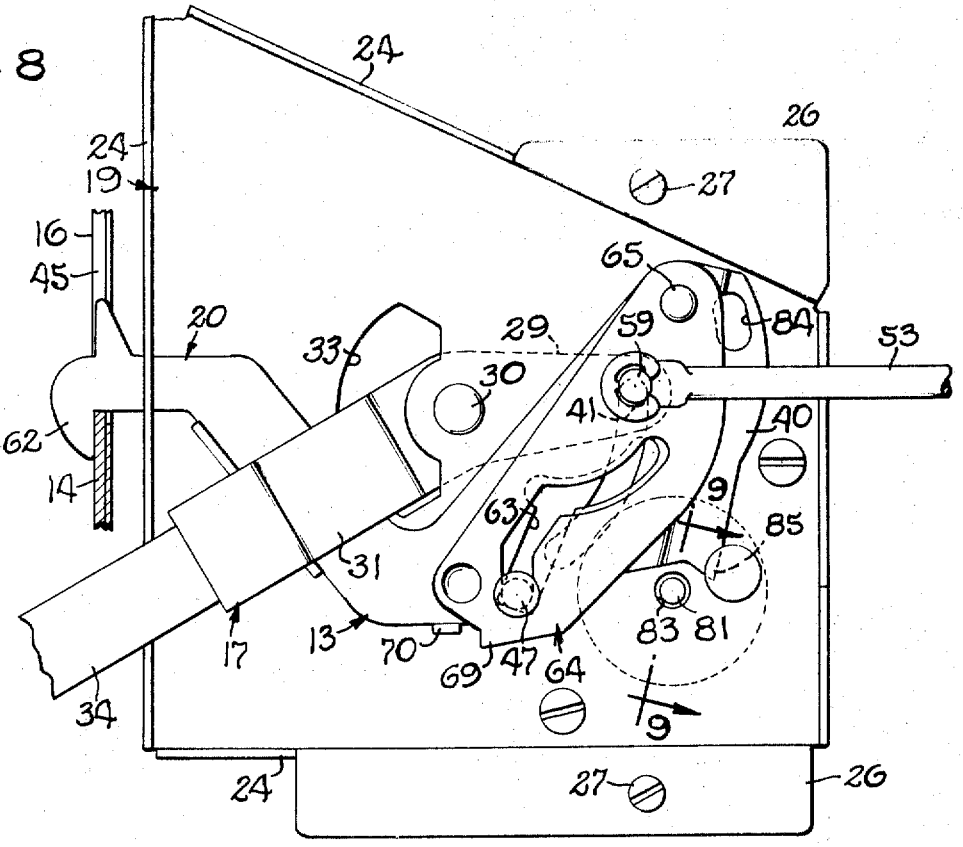
FIG. 8 is a view similar to FIG. 4 and showing the parts with the bolt in its latching position.

As shown in the drawings for purposes of illustration, the invention is embodied in a latch 10 mounted within the cabinet 11 of an appliance such as a self-cleaning oven and including a bolt 13 selectively engageable with a strike 14 on the oven door 16 to latch the door in a tightly closed position prior to operation of a high-temperature heating unit (not shown )for burning off food and grease from the oven walls. In such a latch, an operating handle 17 is pivoted on a latch base or mounting bracket 19 and is connected to the bolt which is guided on the base so that counterclockwise swinging of the handle from an unlatched position to a latched position and then to a tight-sealing position (see FIG. 2) results in a two-step movement of the bolt to latch the door. As the handle is swung between its positions, the bolt first moves outwardly along a first predetermined path from a retracted position (FIG. 4) to an extended position (FIG. 7) in which an outer end 20 of the bolt is disposed in engagement with the strike, and then moves inwardly along a second predetermined path to a latching position (FIG. 8) to draw the door into tight-sealing relation with the cabinet. To prevent activation of the high-temperature cleaning unit when the door is open or free to open, a safety switch 21 (FIGS. 1 and 2) in the control circuit of the unit is ctuated by the draw-in motion of the bolt and condi-ions the circuit for operation only when the door is losed and tightly sealed.

In this instance, the latch base 19 is a generally rec-angular sheet metal plate disposed in a horizontal posi-ion above an insulated top wall 23 (FIG. 1) of the oven hamber and formed with upstanding flanges 24 (FIG. 8) round its peripheral edges. The outer flange lies against nd is secured to the inner side of a frame strip 25 (FIG. ) extending along the front of the cabinet 11, and the ide flanges are formed with outturned mounting wings 6 (FIGS. 2 and 8) fastened to the cabinet by screws 27. he operating handle 17 is substantially L-shaped in levation and includes a horizontal arm 29 disposed eneath the base plate 19 and pivotally connected to the atter by a rivet 30. Formed integrally with and upstanding rom the outer end of the horizontal arm is a substantially ertical arm 31 passing upwardly through a relatively ide arcuate slot 33 punched out of the base plate to ac-ommodate swinging of the handle about the rivet. At its ree end, the vertical arm of the handle is connected to spring metal extension 34 (FIGS. 1 and 3) mounted antilever fashion and projecting outwardly through an rcuately curved and elongated slot 35 (FIGS. 1, 3 and 0) formed in a bezel 36 fastened to the front of the abinet 11. A knob 37 mounted on the outer end of the xtension facilitates gripping of the handle as it is swung etween its positions.

Figure 1:
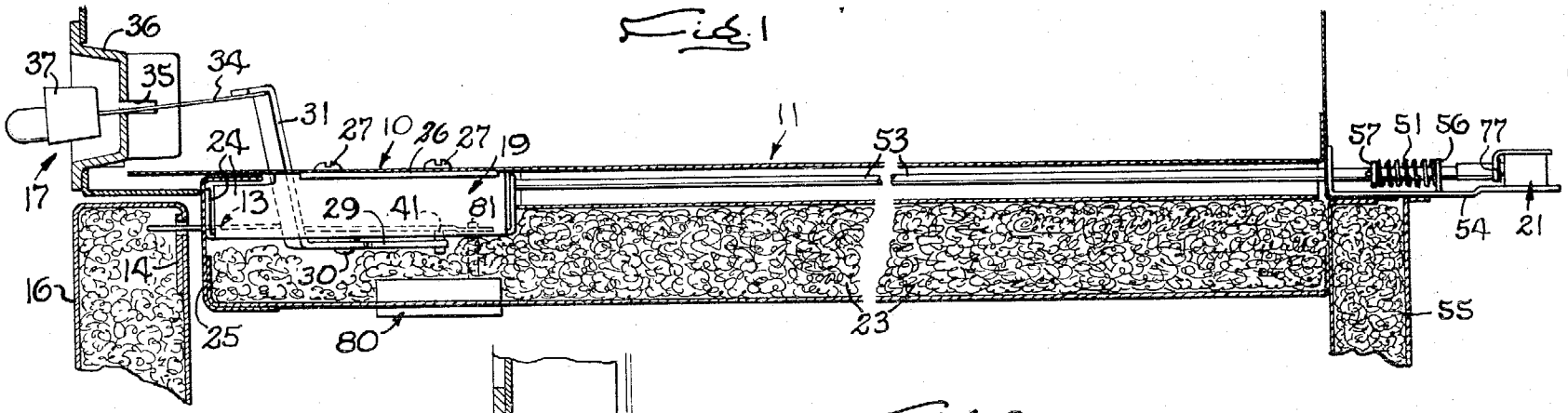
Figure 2:
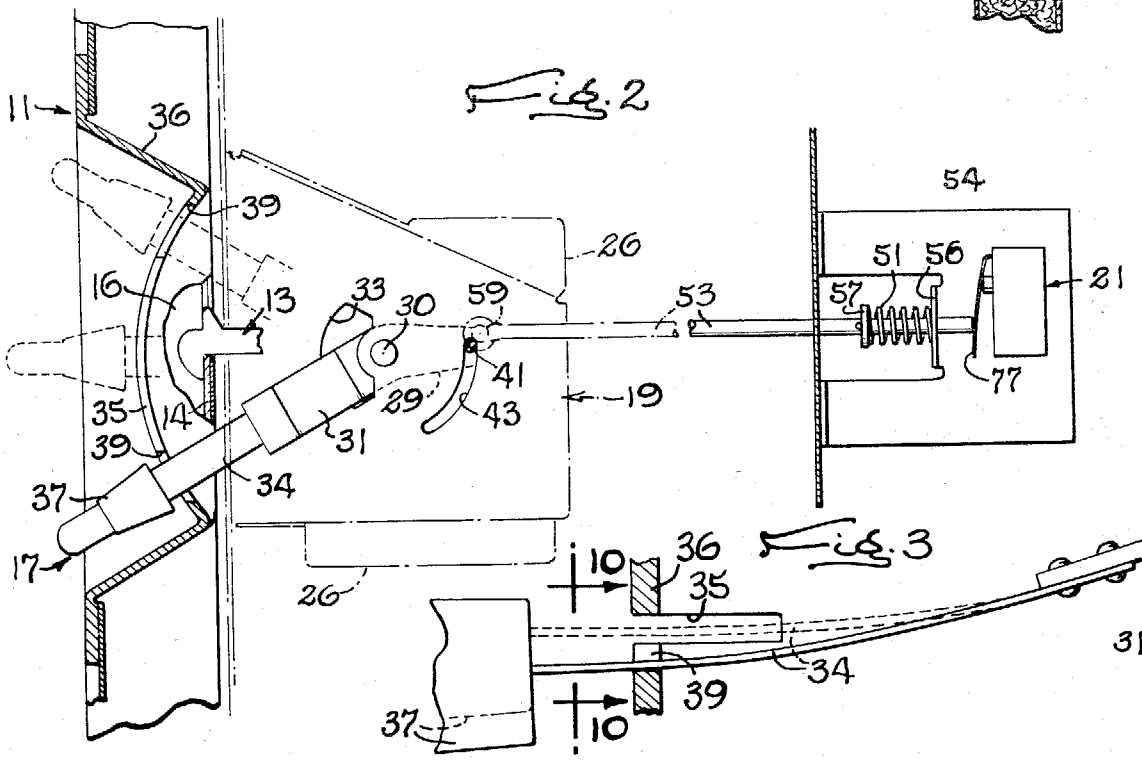
FIG. 2 is a schematic plan view of the appliance and latch and illustrating the different positions of the operating handle.
Figure 3:
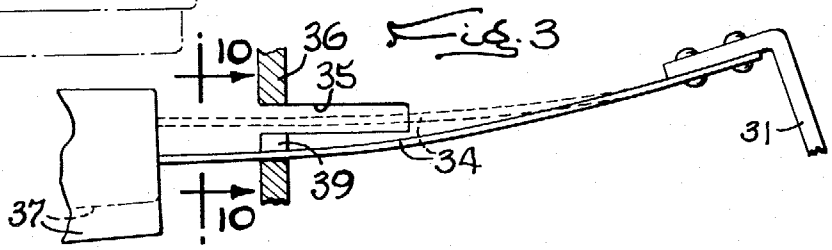
FIG. 3 is an enlarged side elevation of parts shown in FIG. 1.
Figure 10:
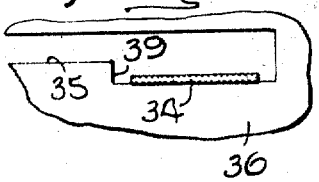
FIG. 10 is a fragmentary cross-section taken substantially along the line 10—10 of FIG. 3.

As shown most clearly in FIGS. 1 and 3, the resilient andle extension 34 is inclined downwardly and forwardly hrough a slight angle and bears against the bottom edge f the slot 35 in the bezel 36 thereby to develop sufficient rictional force to hold the handle 17 in any position to hich it is swung. To protect against inadvertent move-ent of the handle from its unlatched and tight-sealing ositions, a detent notch 39 (FIGS. 2, 3 and 10) is ormed in the bottom edge of the slot 35 at each end hereof to receive the extension 34 when the handle is n its extreme positions. With this arrangement, the ex-ension must be flexed upwardly and out of the notches s shown in phantom in FIG. 3 in order to swing the andle between the unlatched and tight-sealing positions. he extension rides along the bottom edge of the slot 5 during such swinging and, upon reaching the opposite xtreme position, springs downwardly into the adjacent otch with a positive snap action to hold the handle ecurely in place.

Figure 12:
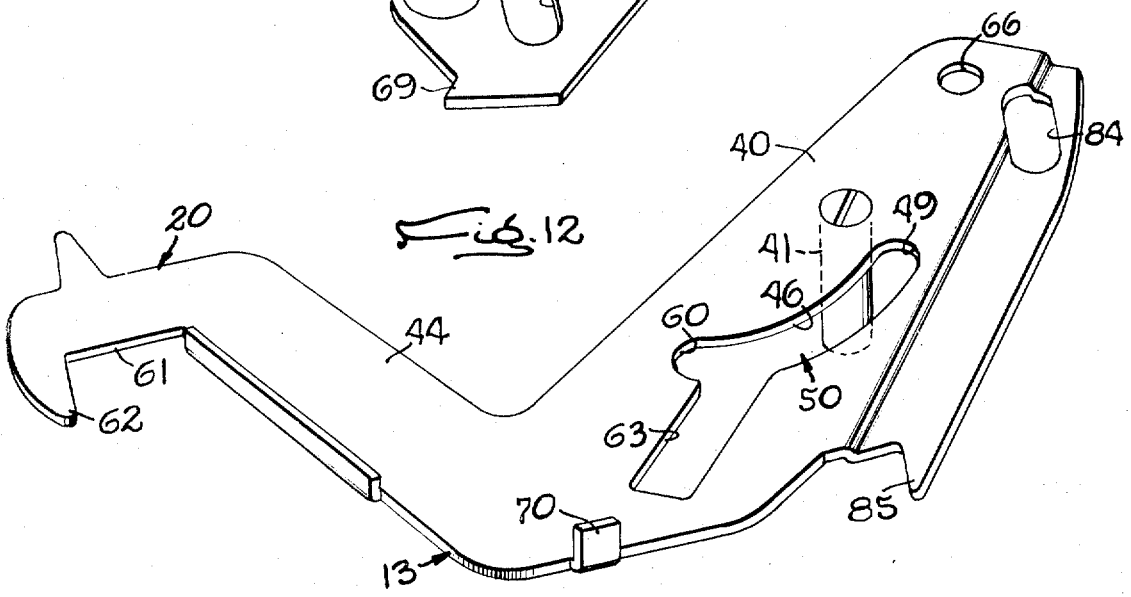
FIG. 12 is an enlarged perspective view of the bolt.
Figure 13:
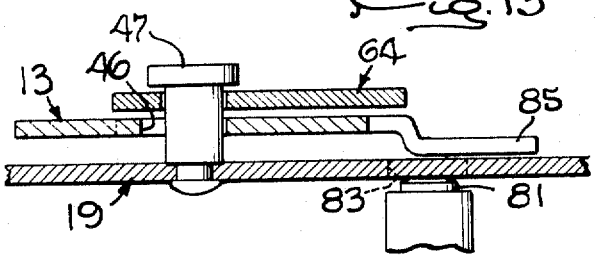
FIG. 13 is an enlarged fragmentary cross-section taken substantially along the line 13—13 of FIG. 7.

The bolt 13 is a sheet metal stamping disposed above the ase plate 19 and formed with an inner main body por-on 40 (FIGS. 4 and 12) pivotally connected to the nner end of the horizontal arm 29 of the handle 17 y a pin 41 (FIGS. 4 and 5) fastened securely to the bolt nd projecting downwardly therefrom through a slot 43 ormed in the base plate and arcuately curved about the xis of the rivet 30. At its lower end, the pin is loosely eceived within a hole in the horizontal arm so that the olt may swing relative to the handle as the latter is wung between the unlatched and tight-sealing positions ith the pin 41 traveling in the slot 43. Angularly offset nd projecting generally outwardly from the body 40 of the olt is an elongated neck 44 (FIG. 12) which terminates n the outer end 20 for engaging the strike 14 on the oor 16. The outer end of the bolt is disposed behind the ront of the cabinet 11 and inside the outer flange 24 n the base on the base plate 19 when the handle is in s unlatched position and the bolt is in its retracted osition (see FIG. 4) and therefore will not be struck y the door when the latter is closed during normal ooking operations when the latch is not in use. As the andle is swung toward its latched position (FIG. 7), its notion is imparted to the bolt which moves to the ex-ended position with the outer end 20 projecting out-ardly through alined slots formed in the outer flange 4 and the frame strip 25 during such movement. In addition, the outer end passes into a slot 45 (FIG. 7) formed in the inner liner of the door and engages the strike 14 which, in this instance, is formed by the right end wall of the slot 45 (as viewed from the front of the latch in FIG. 7). Upon movement of the handle from its latched position to its tight-sealing position (FIG. 8), the outer end of the bolt moves inwardly to its latch-ing position thereby to seal the door tightly against the cabinet 11.

Since activation of the high-temperature cleaning unit with the door 16 in an open position would allow smoke and odors to escape from the cabinet 11 or might cause a sudden flame, the safety switch 21 for the unit is ar-ranged to be actuated by the inward or draw-in motion of the bolt 13 and such motion is blocked when the door is not closed. Thus, when the door is open, the bolt cannot be moved inwardly from the extended position (FIGS. 6 and 7) to the latching position (FIG. 8) to actuate the switch and the cleaning unit thereby is disabled.

In accordance with the present invention, the bolt 13 is held for movement along the first path from the retracted position (FIG. 4) to the extended position (FIGS. 6 and 7) and is positively blocked from moving inwardly along the second path to the latching position (FIG. 8) until the bolt engages the strike 14. Moreover, engagement of the bolt with the strike frees the bolt from movement along the first path and causes the bolt to shift to move-ment along the second path to the latching position. Ac-cordingly, the bolt cannot move inwardly until it engages the strike, and actuation of the switch 21 thus is im-possible when the door 16 is in an open position and the strike is disposed remotely from the bolt.

Figure 6:
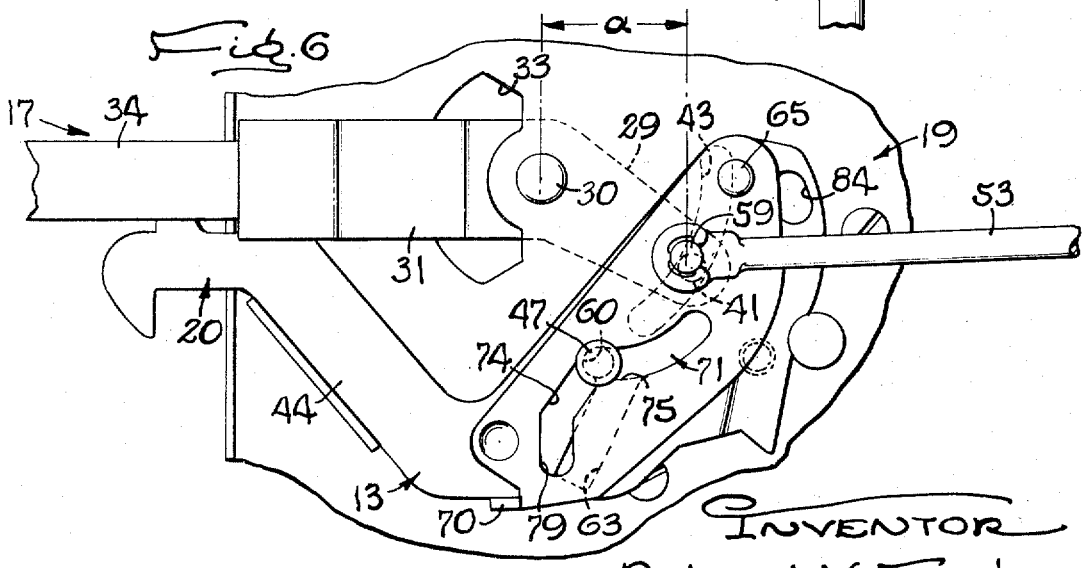
FIG. 6 is a view similar to FIG. 4 and showing the parts with the door open and the bolt in its extended position.
Figure 7:
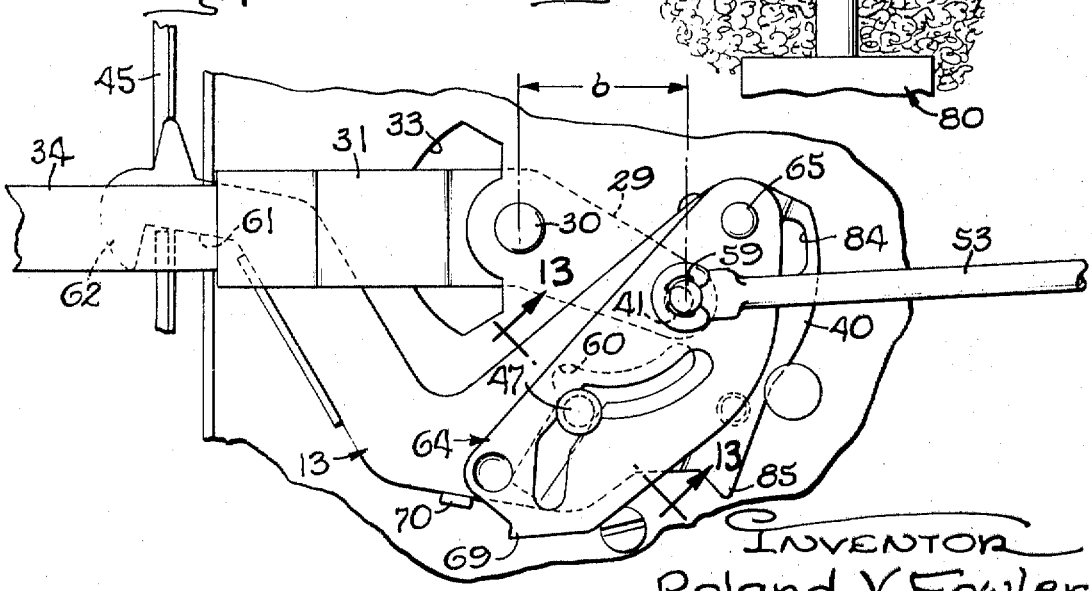
FIG. 7 is a view similar to FIG. 4 and showing the parts with the door closed and the bolt in its extended position.

To achieve the foregoing ends, the bolt 13 is formed with a guide element 46 (FIGS. 4 and 12) which is held against a guide element 47 (FIG. 4) on the base plate 19 as the handle 17 is swung between its unlatched and latched positions. During such swinging of the handle, the elements 46 and 47 coact to guide the outer end 20 of the bolt outwardly along a substantially arcuate path from the retracted position (FIG. 4) to the extended position (FIG. 7). When the door 16 is closed, the outer end engages the strike 14 and such engagement causes the guide element 46 to move away from the guide ele-ment 47 (FIG. 7) thereby to permit the bolt to move inwardly to the latching position (FIG. 8) as the handle is swung from its latched position to its tight-sealing posi-tion. When the door is open, however, and the bolt is moved to its extended position without engaging the strike as shown in FIG. 6, the guide elements remain against each other to block both inward movement of the bolt to the latching position and continued swinging of the handle toward its tight-sealing position.

In the present instance, the guide element 46 is the convex edge of an arcuately curved portion 49 (FIG. 12) of a slot 50 formed in the bolt 13, and the guide element 47 is a headed stud rigid with and upstanding from the base plate 19 and projecting into the slot 50. To hold the convex edge 46 against the stud 47, a coil spring 51 (FIGS. 1 and 2) is telescoped over an elongated rod 53 extending rearwardly from the bolt and slidably guided through a bracket 54 mounted on the upper side of a rear wall 55 of the cabinet 11. The spring is contracted between an upstanding flange 56 integral with the bracket and a stop 57 rigid with the rod so as to urge the rod outwardly or to the left. The effective force of the spring is directed from the rod to the bolt through a connecting point 59 located to the left of the pivot pin 41 (as viewed from the front of the latch) connecting the bolt to the short arm 29 of the handle 17 and thus urges the bolt counterclockwise about the axis of the pin to force the convex edge 46 against the stud 47.

Initially, the bolt 13 is disposed in its retracted position (FIG. 4) with the stud 47 disposed at the inner end of the slot 50 in the bolt. As the handle 17 is swung about the rivet 30 from its unlatched position (FIG. 4) to its latched position (FIG. 6), the bolt simultaneously swings about the axis of the pin 41 so that the outer end 20 of the bolt moves from the retracted position (FIG. 4), outwardly along the front of the outer flange 24, and to the extended position shown in FIGS. 6 and 7 in substantial alinement with the position of the strike 14 when the door 16 is closed. During such movement, the convex edge 46 is pressed against and moves along the stud 47 to define the path that the outer end 20 follows. When the outer end of the bolt reaches the extended position with the door in an open position as shown in FIG. 6, continued swinging of the handle through a short arc toward the tight-sealing position simply moves an outer end 60 (FIGS. 6 and 12) of the arcuate portion 49 of the slot 50 against the stud 47. Engagement of the outer detent end 60 of the slot with the stud prevents further counterclockwise movement of the handle beyond the position shown in FIG. 6 and, more importantly, blocks inward movement of the bolt to the latching position shown in FIG. 8. The bolt remains in the extended blocked position (FIG. 6) and must be returned to the retracted position by clockwise swinging of the handle before the door 16 can be shut and latched closed.

When the door 16 is in a closed position, counterclockwise swinging of the handle from the unlatched position to the latched position again moves the bolt 13 from the retracted position (FIG. 4) to the extended position in the same manner as described above. Upon reaching the extended position, however, a relatively straight portion 61 of the outer end 20 of the bolt engages the strike 14 as shown in FIG. 7, and a hook 62 adjacent the straight portion moves alongside the outer side of the strike so that the door is latched, but not sealed tight, and cannot be opened without retracting the bolt. Engagement of the straight portion 61 of the bolt with the strike, along with further movement of the handle toward the tight-sealing position, causes the straight portion 61 to pivot on the strike and simultaneously to slide inwardly along the strike. This compound motion forces the main body portion 40 of the bolt sharply to the left (as viewed from the front of the latch) and pulls the convex edge 46 of the slot 50 in the bolt away from the stud 47 against the action of the spring 51. In addition, the hook 62 moves inwardly in a substantially straight line and engages the outer side of the strike (FIG. 8) to draw the door 16 into tight-sealing relation with the cabinet 11.

To accommodate the compound sliding and pivoting motion of the bolt 13 occurring as an incident to engagement with the strike 14, the slot 50 in the bolt is formed with a relatively straight outwardly extending portion 63 (FIGS. 4 and 12) intersecting the arcuate portion 49 just inwardly of the outer detent end 60 of the arcuate portion. The outwardly extending slot portion 63 travels along the sud 47 as the bolt is moved from the extended position shown in FIG. 7 to the latching position shown in FIG. 8. The width of the outwardly extending slot portion is considerably greater than the diameter of the stud, herein about ⅛ of an inch greater, and thus the compound inward movement of the bolt toward the latching position may begin at different points along the path of travel from the retracted position to the extended position depending upon the lateral disposition of the strike 14. As a result, the strike may be misalined laterally as much as ¼ of an inch and the latch 10 still will function properly.

It will be apparent from the foregoing that inward shifting of the bolt 13 to the latching position is dependent upon whether or not the door 16 is closed and the strike 14 is in place when the handle is operated. When the door is open, the spring 51 holds the convex slot edge 46 against the stud 47, and these elements, along with the outer detent end of the slot 50, prevent the bolt from moving inwardly from the extended position to the latching position. If the door is closed, the bolt engages the strike and the force resulting from such engagement overcomes the spring force and separates the guide elements 46 and 47 while shifting the bolt inwardly to the latching position.

An important advantage is gained by the placement of the slot 50 and the stud 47 so that the arc of rotation of the operating handle 17 necessary to move the bolt 13 through its motions is reduced to about 60 degrees without reducing the handle motion available to effect the drawing-in of the bolt and the tight sealing of the door 16. As shown most clearly in FIGS. 4, 6 and 7, the stud and the convex edge 46 of the slot 50 are spaced a greater distance from the rivet 30 than from the pin 41. Thus, during movement of the bolt from the retracted position to the extended position, the bolt travels at a greater angular velocity than the handle and, as a result, movement of the handle through a 30 degree arc to the latched position is effective to move the outer end 20 of the bolt through approximately a 50 degree arc to the extended position. Accordingly, a substantial portion of the full arc of the handle remains, herein about 30 degrees, and is utilized to draw the door inwardly toward the cabinet 11 and into sealing engagement with the usual sealing gasket (not shown). Since the work done is equal to the force exerted times the distance moved, it will be apparent that the use of an arc of substantial length to effect the draw-in motion minimizes the force required to close and seal the door.

Figure 11:
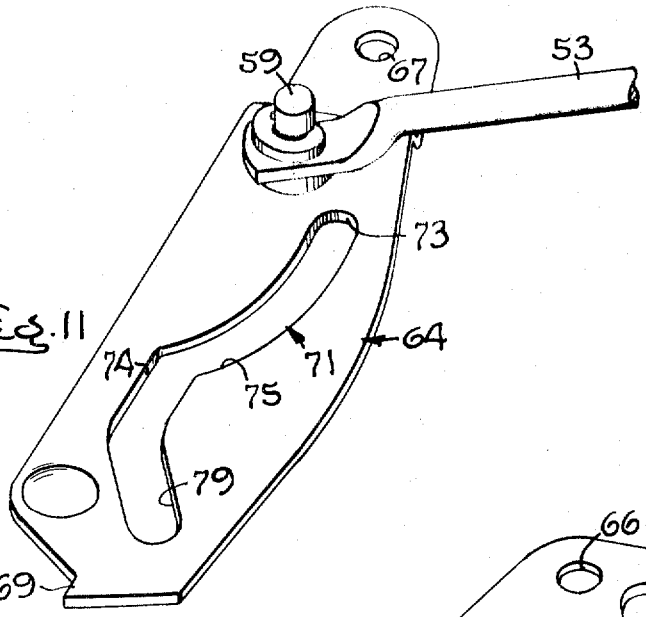
FIG. 11 is an enlarged perspective view of the blocking member.

The present invention also contemplates the provision of a novel blocking member 64 (FIGS. 4 and 10) to help block inward movement of the bolt 13, to actuate the switch 21 in response to such inward movement, and to cooperate with the bolt to promote positive latching action while accommodating misalinement of the strike 14. Herein, the blocking member is a lever pivotally connected near its inner end on the inner end of the main body 40 of the bolt by a rivet 65 rigidly fastened in a hole 66 (FIG. 12) in the bolt and projecting upwardly and loosely through a hole 67 (FIG. 11) in the lever 64.

Figure 4:
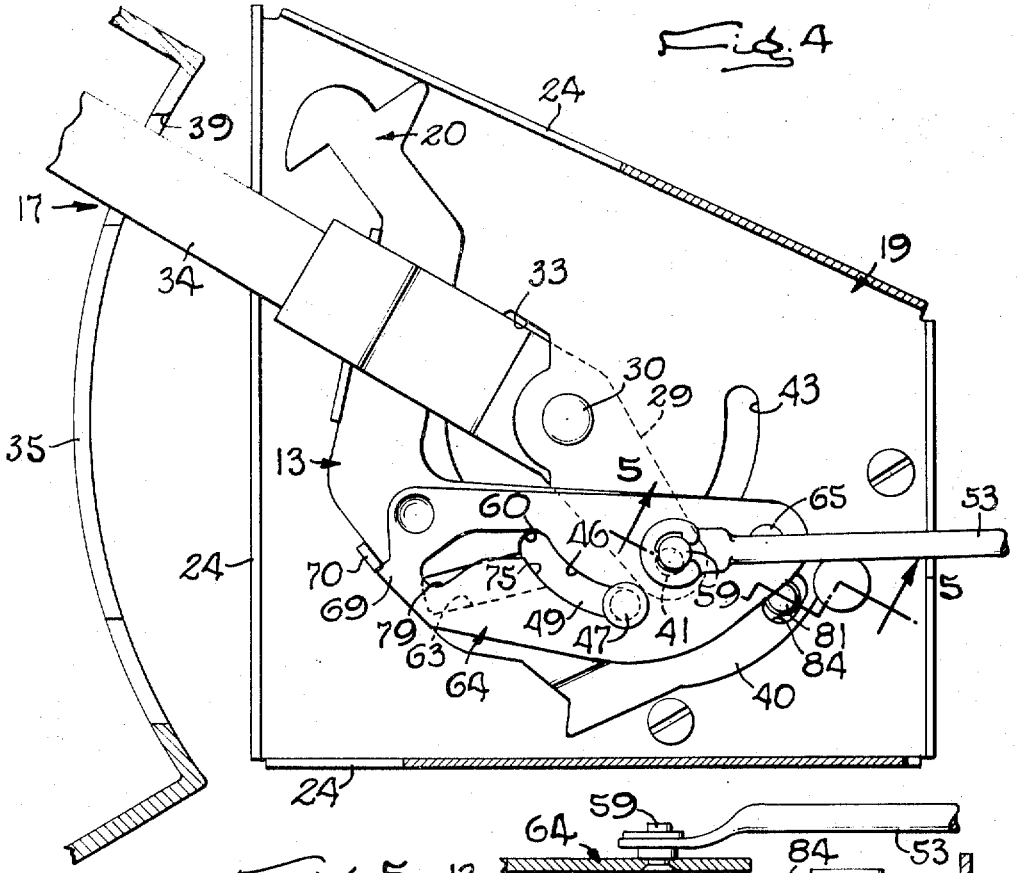
FIG. 4 is a fragmentary plan view of the latch and showing the parts with the bolt in its retracted position.
Figure 5:
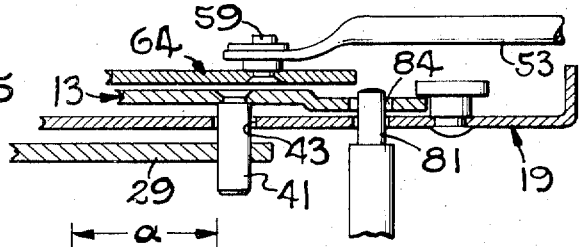
FIG. 5 is a fragmentary cross-section taken substantially along the line 5—5 of FIG. 4.

When the bolt 13 is positioned as shown in FIGS. 4 and 6, the lever 64 completely overlies the bolt and is prevented from clockwise swinging relative to the bolt by an abutment surface 69 (FIGS. 4 and 11) on the outer end of the lever engaging a lug 70 (FIGS. 4 and 12) upstanding from the bolt. The lever thus, in effect, is rigid with the bolt and serves to transmit the force of the spring 51 to the bolt. For this purpose, the connecting point 59 directing the spring force from the elongated rod 53 to the bolt is a rigid post projecting upwardly from the lever just to the left of the pivot pin 41 (as viewed from the front of the latch) and pivotally connected to the inner end of the rod. Accordingly, the spring 51 urges the rod outwardly and the spring force acts directly on the lever 64 tending to swing the latter clockwise about the rivet 65 while also acting through the lever and on the bolt to urge the bolt counterclockwise about the pin 41.

In this instance, the lever 64 is formed with a slot 71 (FIGS. 4 and 11) having an arcuately curved portion 73 which is slightly wider than the arcuate portion 49 of the slot 50 in the bolt 13. In addition, the slot 71 in the lever is formed with an outwardly extending portion 74 intersecting the outer end of the arcuate portion 73, the outwardly extending portion 74 of the lever slot 71 being considerably narrower than the outwardly extending portion 63 of the bolt slot 49 and having a width approximately 1/32 of an inch greater than the diameter of the stud 47.

In the retracted position (FIG. 4) of the bolt 13 and as the bolt is being moved to the extended position (FIG. 6), the lever 64 is disposed in an active position in which the arcuate portion 73 of the lever slot 71 overlies and is alined with the arcuate portion 49 of the bolt slot 50 while the outwardly extending portion 74 of the lever slot 71 is outwardly offset from the outwardly extending portion 63 of the bolt slot 50. As a result, the intersection between the arcuate and outwardly extending portions 49 and 63 of the bolt slot 50 is covered and blocked by an edge surface 75 on the lever (FIGS. 4 and 11) formed near the junction of the arcuate and outwardly extending portions 73 and 74 of the lever slot 71. During movement of the bolt from the retracted position to the extended position, the lever moves bodily with the bolt due to the engagement with the lug 70 with the abutment surface 69 and if the bolt fails to engage the strike 14, the lever simply remains in a stationary active position relative to the bolt as the outer detent portion 60 of the bolt slot 50 engages the stud 47 to prevent further movement of the bolt. It will be seen that, in addition to the spring force pressing the convex edge 46 of the bolt slot 50 against the stud 47 to preclude movement of the bolt to the latching position, the edge surface 75 on the lever extends across the intersection between the arcuate and outwardly extending portions 49 and 63 of the bolt slot 50 thereby positively blocking any movement of the outwardly extending portion 63 along the stud 47. Accordingly, it is impossible to move the bolt to the latching position.

When the bolt 13 moves to the extended position and the outer end 20 engages the strike 14 (FIG. 7), the bolt substantially swings about the strike and the main body 40 of the bolt begins moving to the left. Such initial leftward movement draws the edge surface 75 of the lever 64 against the stud 47 so that the lever is prevented from moving bodily with the bolt and, at the same time, is swung counterclockwise about the axis of the rivet 65 due to the camming action caused by engagement of the edge surface 75 with the stud 47. As a consequence, the lever swings to an inactive position (FIGS. 7 and 8) in which the outwardly extending portions 74 and 63 of the lever slot 71 and the bolt slot 50, respectively, are alined and the intersection between the arcuate and outwardly extended portions 49 and 63 of the bolt slot 50 is unblocked. The bolt thus is freed for complete movement to the latching position (FIG. 8) with the outwardly extending portions 63 and 74 traveling along the stud 47.

In addition to helping the spring 51 block movement of the bolt 13 to the latching position, the lever 64 also coacts with the bolt to maintain the parts of the latch relatively tight with respect to each other while still permitting the latch to function properly even through the strike 14 is misalined due to manufacturing or installation defects. Because the outwardly extending portion 63 of the bolt slot 50 is considerably wider than the stud 47, the movement of the bolt to the latching position may occur at various points with the strike disposed in different lateral positions on the door 16. Since the outwardly extending portion 74 of the lever slot 71 is about the same width as the stud, however, the bolt is prevented from moving indiscriminately relative to the stud in spite of the clearance between the stud and the outwardly extending portion 63 of the bolt slot 50. Moreover, the spring 51 acting through the rod 53 and the lever acts to develop a desired amount of friction within the pivotal connections 30, 41 and 65 of the latch parts thereby to eliminate undue looseness between the parts and to promote good latching action.

Another important function of the lever 64 is to actuate the safety switch 21 in response to the inward movement of the bolt 13 to the latching position. To this end, the switch is mounted on the bracket 54 (FIGS. 1 and 2) at the rear of the cabinet 11 and includes an operating arm 77 in the form of a flat spring plate disposed immediately behind the rod 53. The rod moves inwardly or rearwardly sufficiently far to depress the arm and actuate the switch only when the lever 64 pivots relative to the bolt 13 as an incident to the bolt moving to the latching position. As shown most clearly in FIG. 6, the distance a between the axis of the rivet 30 and the post 59 taken along a straight line extending through the rod 53 and the post is approximately 1 1/16 inches when the door 16 is open the bolt is blocked from moving forward toward the latching position. When the bolt is blocked, the rod has not traveled rearwardly sufficiently far to depress the operating arm 77 fully and actuate the switch 21. As soon as the bolt begins moving to the latching position after engaging the strike 14, the lever 64 swings counterclockwise through a short arc about the rivet 65 (see FIG. 7) thereby moving the rod rearwardly so that the corresponding distance b between the rivet 30 and the post 59 increases to 1¼ inches. This slight rearward movement of the rod is effective to close the switch thereby conditioning the cleaning unit for operation as an incident to the door being safely latched. When the handle 17 has been swung fully to the tight-sealing position and the bolt has been moved fully to the latching position (FIG. 8), the lever is permitted to swing clockwise through a short arc about the rivet 65 under the influence of the spring 51 from the FIG. 7 position to the FIG. 8 position due to an inclined relief portion 79 (FIGS. 7 and 11) formed at the outer end of the outwardly extending portion 74 of the lever slot 71. Such clockwise swinging of the lever enables the rod to move outwardly a short distance to relieve some of the pressure on the switch arm 77 but not sufficiently far to open the switch 21.

Figure 9:
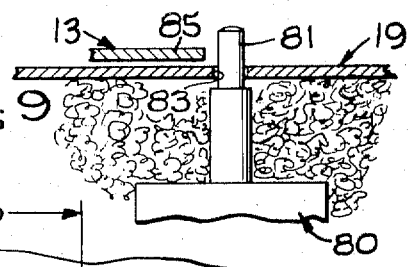
FIG. 9 is a fragmentary cross-section taken substantially along the line 9—9 of FIG. 8.

In order to prevent the door 16 from being opened while the switch 21 is closed and the cleaning unit is operating, a thermostatically operated safety device 80 (FIGS. 1, 5, and 9) is mounted in the cabinet 11 beneath the base plate 19 of the latch 10. Herein, the safety device includes an upright pin 81 which pops upwardly through a hole 83 (FIG. 9) in the base plate when temperature within the oven is above 320 degrees Fahrenheit. If the oven is being used for normal cooking operations and the bolt 13 is in the retracted position (FIG. 4) the pin 81, upon popping up through the hole 83, projects through a hole 84 (FIGS. 4, 5, and 12) in the bolt to prevent the bolt from being moved from the retracted position and to prevent inadvertent operation of the cleaning unit. When the bolt is in the latching position (FIG. 8) and the cleaning unit is in use, the pin 81 extending through the base plate 19 engages an ear 85 (FIGS. 8, 9, and 12) on the bolt thereby blocking movement of the bolt from the latching position and opening of the door 16 until the temperature of the oven drops below 320 degrees.

Figure 14:
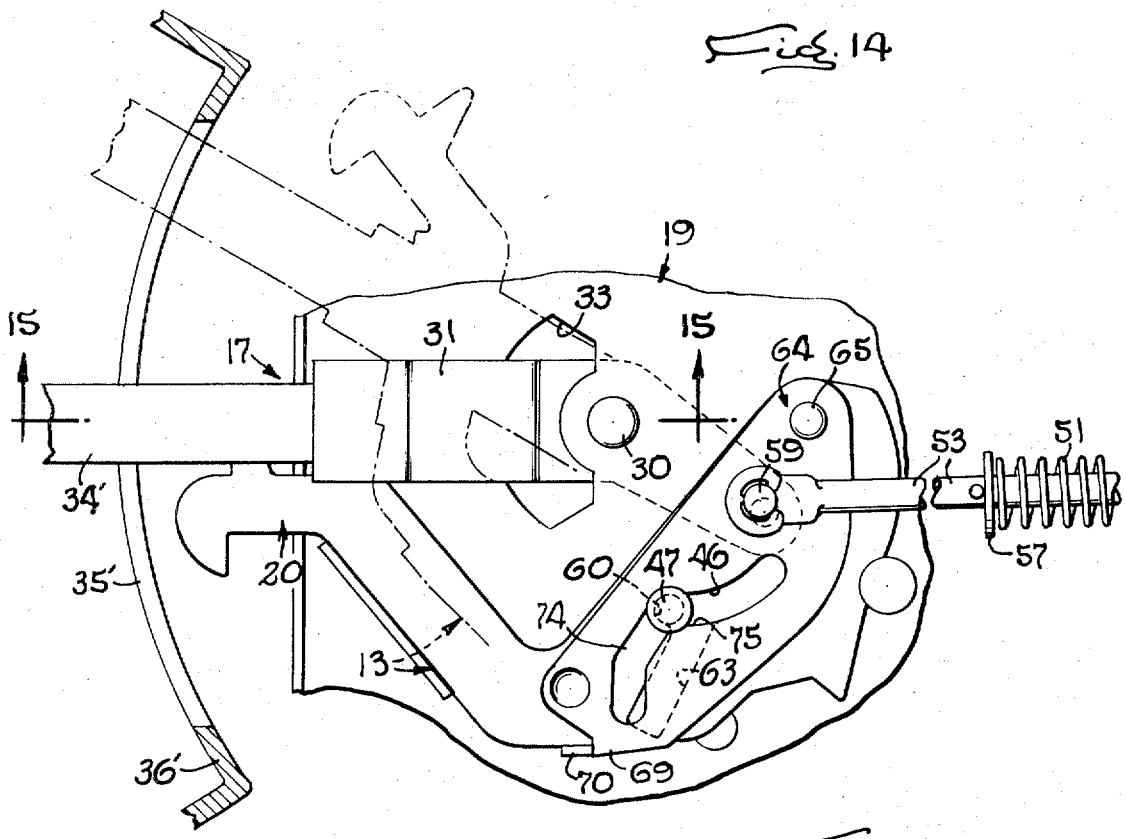
FIG. 14 is a view similar to FIG. 4 but showing a modification of the latch.
Figure 15:
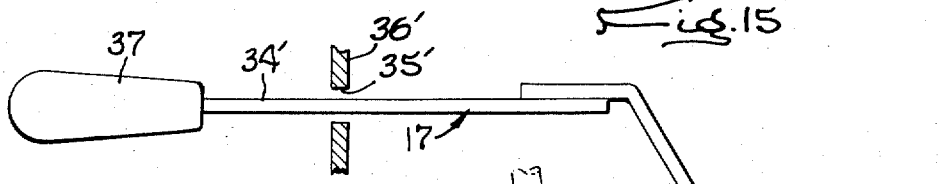
FIG. 15 is a fragmentary cross-section taken substantially along the line 15—15 of FIG. 14.

A modified form of the latch 10 is shown in FIGS. 14 and 15 in which the bolt 13, instead of remaining in its extended blocked position if the strike 14 is not in place, is returned automatically to its retracted position by the action of the spring 51. For this purpose, the downwardly inclined cantilever spring extension 34 of the handle 17 is replaced with a horizontal extension 34' of relatively rigid metal vertically centered between the upper and lower edges of a slot 35' formed in a bezel 36'. Because the frictional force developed by the spring extension 34 is eliminated and because the post 59 which directs the force of the coil spring 51 from the lever 64, through the bolt 13 and to the handle 17 is located to the right of the rivet 30 (as viewed from the front of the latch) when the bolt is in its retracted and extended positions, the coil spring tends to swing the lever, the bolt and the handle clockwise about the axis of the rivet 30. Accordingly, when the handle and bolt are moved from their unlatched and retracted positions, respectively, shown in phantom in FIG. 14 and are moved to the latched and extended positions shown in full without engaging the strike, the spring 51 immediately returns the handle and the bolt back to the unlatched and retracted positions as soon as the handle is manually released. The bolt thus will be disposed in the retracted position behind the front of the cabinet automatically before the door 16 is closed thereby avoiding damage to the bolt.

After the door 16 has been closed and as the bolt 13 is moved to the latching position (FIG. 8), the post 59 passes across a straight line extending between the rivet 30 and the spring 51 causing the latter to urge the bolt, the lever 64 and the handle 17 counterclockwise about the rivet 30. The bolt and the handle thus are held securely in their latching and tight-sealing positions until the handle is intentionally moved back toward its unlatched position. In a spring-back latch of this type, the lever 64 not only serves to enhance the latching action and to actuate the switch 21 but also properly locates the force of the spring 51 relative to the handle 17 so that the latter will be returned to the unlatched position if the door is opened and will be held in the tight-sealing position when the door is closed. Except for the differences in the construction of the handle and the bezel, the latch shown in FIGS. 14 and 15 is identical to the previously described modification.

Figure 16:
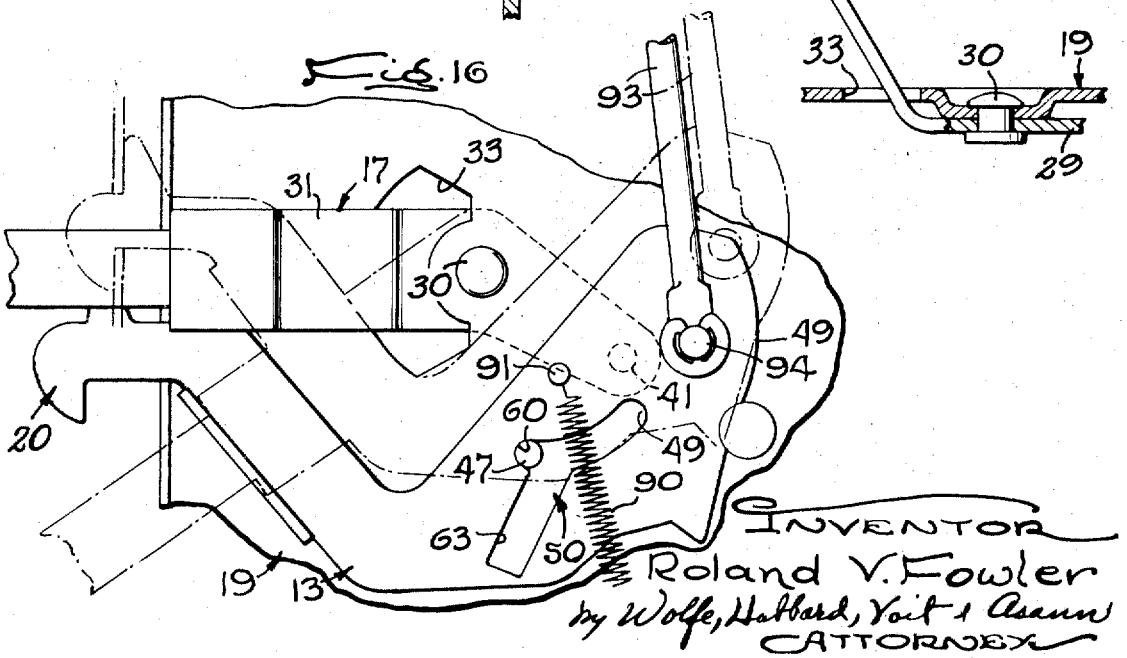
FIG. 16 is a view similar to FIG. 4 but showing still a further modification of the latch.

Still another embodiment of a novel latch constructed in accordance with the present invention is shown in FIG. 16 in which the blocking lever 64 is eliminated. In this instance, the convex guide edge 46 of the bolt slot 50 is pressed against the guide stud 47 by a resiliently yieldable contractile spring 90 stretched between one of the sides flanges 24 (not visible in FIG. 16) and a lug 91 upstanding from the bolt 13 and disposed outwardly of the pivot pin 41. As the handle 17 is swung to the latched position shown in full without the outer end 20 of the bolt engaging the strike 14, the bolt pivots about the pin 41 and moves in a path defined by the convex edge 46 until the outer detent end 60 of the slot 50 engages the stud 47 to block inward movement of the bolt to the latching position. When the outer end 20 engages the strike, however, the compound pivoting and sliding movement of the bolt produced by such engagement in conjunction with continued swinging of the handle toward the tight-sealing position shown in phantom causes the main body 40 of the bolt to move sharply to the left thereby pulling the convex edge 46 away from the stud and stretching the spring 90. The outwardly extending portion 63 of the bolt slot 50 then travels along the stud to permit complete inward movement of the bolt to the latching position. A safety switch may be actuated as an incident to the inward movement by a rod 93 connected to a post 94 projecting upwardly from the main body of the bolt. In this modification, the spring 90 presses the edge 46 against the stud 47 to restrict movement of the bolt along a first path from the retracted position to the extended position, and then the spring is disabled as a result of engagement of the bolt with the strike to enable the bolt to move inwardly along the second path to the latching position. The basic principle of operation is the same as in the previous modification with the primary distinction being that the advantages gained by the lever 64 are not present.

I claim as my invention:

1. In combination with an appliance cabinet formed with an access opening, a door for closing the opening, and a strike on the door for latching the door in a closed position adjacent the cabinet, the improvement comprising, a latch having a base mounted within the cabinet, an operating handle having an inner end pivoted on said base and an opposite end extending outwardly beyond the cabinet, said handle being swingable about a first axis between angularly spaced unlatched, latched and tight-sealing positions, a latching bolt mounted on said handle for swinging relative to the latter about a second axis spaced inwardly from said first axis and having an outer end engageable with the strike to latch the door, said bolt being formed with a slot having a curved portion and having an outwardly extending portion intersecting said curved portion, a guide member on said base and projecting into said curved portion of said slot as said handle is swung from said unlatched position to said latched position thereby to guide said bolt for movement from a retracted position with said outer end beside the cabinet to an extended position with said outer end spaced outwardly from the cabinet to engage the strike, said guide member projecting into said outwardly extending portion of said slot as said handle is swung from said latched position to said tight-sealing position thereby enabling movement of said bolt from said extended position to a latching position with said outer end shifted inwardly toward the cabinet to draw in the door, a lever pivoted on said bolt and disposed in a normal active position blocking the intersection between said curved and outwardly extending portions of said slot as said bolt is moved from said retracted position to said extended position thereby to prevent movement of the bolt to said latching position and swinging of said handle to said tight-sealing position when said outer end moves to or beyond said extended position without engaging the strike, and a cam surface on said lever engageable with said guide member as an incident to said outer end engaging the strike thereby to swing the lever into an inactive position unblocking said intersection to permit movement of said bolt to said latching position and swinging of said handle to said tight-sealing position.

2. A latch as defined in claim 1 in which said lever is formed with a guide slot having a curved portion alined with the curved portion in the slot in said bolt when said lever is in said active position.

3. A latch as defined in claim 2 in which said guide slot has an outwardly extending portion intersecting said curved portion and alined with the outwardly extending portion in the slot in said bolt when said lever is in said inactive position.

4. A latch as defined in claim 3 in which said cam surface is formed at the intersections of said curved and outwardly extending portions of said guide slot and extends across the intersection between the curved and outwardly extending portions of said slot in said bolt when said lever is in said active position.

5. A latch as defined in claim 2 in which the end of the curved portion of one of said slots engages said guide member when said outer end moves beyond said extended position without engaging the strike.

6. A latch as defined in claim 3 in which said outwardly extending portion of said guide slot has a width slightly greater than the width of said guide member but less than the width of the outwardly extending portion of the slot in said bolt.

7. In combination with a cabinet having an access opening, a door for closing the opening, and a strike on the door for latching the door in a closed position adjacent the cabinet, the improvement comprising, a latch having a base mounted within the cabinet, an operating handle pivoted on said base for swinging about a first axis between angularly spaced unlatched, latched and tight-sealing positions, a latching bolt mounted on said handle for swinging relative to the latter about a second axis to move first along the front of the cabinet from a retracted position to an extended position in engagement with the strike as said handle is swung from said unlatched position to said latched position, and then to move inwardly from said extended position to a latching position as said handle is swung from said latched position to said tight-sealing position thereby to draw the door inwardly toward the cabinet, a lever pivoted on said bolt and swingable about a third axis between a normal active position blocking inward movement of said bolt toward said latching position and an inactive position permitting such inward movement, coacting guide elements formed on said bolt and said lever, and a guide member on said base engaging said elements to guide said bolt between its positions and operable in response to engagement of said bolt with the strike and initial movement of said bolt from said extended position toward said latching position to cause said lever to swing to said inactive position.

8. A latch as defined in claim 7 in which said guide element on said bolt is a slot formed with a first portion in which said guide member projects as said bolt is moved from said retracted position to said extended position and with a second portion in which said guide member projects as said bolt is moved from said extended position to said latching position, and said lever covers said second portion in said active position and uncovers said second portion in said inactive position.

9. A latch as defined in claim 7 further including a spring acting on said lever to urge the later in a first direction about said third axis, acting through said lever and on said bolt to urge the bolt in the opposite direction about said second axis, and acting through said lever and said bolt and on said handle to urge the handle in the first direction about said first axis when said bolt is in said extended position.

10. A latch as defined in claim 7 further including a spring connected to said lever and acting on said handle through said bolt to urge the handle in one direction about said first axis when the handle is in said latched position and to urge the handle in the opposite direction about said first axis when the handle is in said tight-sealing position.

11. In combination with a cabinet formed with an excess opening, a door for closing the opening and a strike on the door for latching the door in a closed position, the improvement comprising, a latch having a base mounted within the cabinet, an operating handle mounted on said base to move between unlatched, latched, and tight-sealing positions, a bolt guided on said base and connected to said handle to move first into engagement with the strike as said handle is moved from said unlatched position to said latched position and then to shift inwardly in response to engagement with the strike and as an incident to movement of said handle from said latched position to said tight-sealing position thereby to draw the door inwardly toward the cabinet, a member carried on said bolt and movable between a normal active position blocking complete inward movement of said bolt and an inactive position permitting such movement, and means on said base acting on said member in response to initial inward movement of the bolt when the latter engages the strike and causing the member to shift to said inactive position and thereby permit complete inward movement of the bolt.

12. A latch as defined in claim 11 in which said bolt has an outer end engageable with the strike, and said member is carried by said bolt and is spaced inwardly from said outer end sufficiently far to be free from engagement with the strike when the outer end engages the strike.

13. A latch as defined in claim 11 in which said member is disposed in said active position and moves bodily with said bolt as said handle is moved from said unlatched position to said latched position, said member being mounted for movement relative to said bolt from said active position to said inactive position as said handle is moved from said latched position to said tight-sealing position and after the bolt engages the strike, and further including a spring holding said member in said active position with a predetermined force and yielding to allow said member to move to said inactive position directly in response to the force developed by engagement of the bolt with the strike together with continued movement of said handle to said tight-sealing position.

14. In a latch for use with a strike, the combination of, a base, an operating handle mounted on said base for movement between unlatched, latched and tight-sealing positions, a bolt connected to said handle and guided for movement first along a first predetermined path into engagement with the strike as the handle is moved from said unlatched position to said latched position and then for movement *relative to said handle* along a second predetermined path as a result of engagement with the strike and as an incident to movement of said handle from said latched position to said tight-sealing position, and a spring acting on said bolt with a predetermined force to hold the bolt for movement along said first path and to restrict movement of the bolt *relative to said handle* along said second path until the bolt engages the strike, and said spring yielding and the spring force being overcome directly in response to engagement of the bolt with the strike thereby to permit movement of the bolt *relative to said handle* along said second path.

15. A latch as defined in claim 14 including a guide member on said base, a guide element on said bolt engageable with said member to guide the bolt for movement along said first path, and said spring acting on said bolt in a direction urging said guide element against said member when said handle is moved from said unlatched position to said latched position thereby to hold the bolt for movement along said first path.

16. A latch as defined in claim 15 in which said handle is pivoted on said base to swing about a first axis and said bolt is pivoted on said handle to swing about a second axis, and said spring urges said bolt about said second axis to press said guide element against said guide member.

17. In a latching unit, the combination of, a latch having a base, an operating handle mounted on said base for movement between unlatched, latched, and tight-sealing positions, a bolt connected to said handle for movement along a first predetermined path as said handle is moved from said unlatched position to said latched position, a strike movable between a first position spaced from said path and a second position disposed in said path and engageable with the bolt as said handle is moved from said unlatched position to said latched position, said strike normally being disposed in said second position and being operable in response to engagement with the bolt to cause the latter to shift from movement along said first path to movement along a second predetermined path as said handle is moved from said latched position to said tight-sealing position, and a spring holding said bolt for movement along said first path and restricting movement of the bolt along said second path when said strike is in said first position and when said handle is moved from said unlatched position to said latched position and toward said tight-sealing position without said bolt engaging said strike, said spring yielding directly in response to engagement of the bolt with the strike to permit movement of the bolt along said second path.

18. In a latch for use with an appliance cabinet having an access opening, a door for closing the opening, and a strike on *one of* the door *and the cabinet* for latching the door in a closed position against the cabinet, said latch comprising, a base adapted for mounting [within] *on the other of the door and* the cabinet, an operating handle mounted on said base to move between unlatched, latched and tight-sealing positions, a bolt on said base and connected to be moved by said handle, a pin and slot connection between said base and said bolt with said pin bearing against one edge of said slot to guide said bolt in a first predetermined path from an unlatching position to an extended position to engage the strike as said handle is moved from said unlatched position to said latched position, said slot being formed with a portion permitting [inward] movement of said bolt *relative to the base* along a second predetermined path from said extended position to a latching position as said bolt engages the strike and as said handle is moved to said tight-sealing position, said pin shifting relative to said slot and away from said one edge into said one portion during movement of the bolt to its latching position *relative to the base,* a spring acting on said bolt and exerting a predetermined force to keep said pin pressed against said one edge of said slot when said handle is moved from said unlatched position to said latched position and toward said tight-sealing position without the bolt engaging the strike thereby to hold the bolt for movement in said first path and to restrict movement of the bolt *relative to the base* along said second path to said latching position, and the spring force being overcome directly in response to the force created by engagement of the bolt with the strike thereby to permit relative movement of the pin into said one portion of said slot and to permit movement of said bolt *rela-*

*tive to the base* to said latching position as said handle is moved to said tight-sealing position.

References Cited

The following references, cited by the Examiner, are of record in the patented file of this patent or the original patent.

UNITED STATES PATENTS

| | | | |
|---|---|---|---|
| 2,738,211 | 5/1952 | Schlueter | 292—111 |
| 3,005,065 | 10/1961 | Jellies | 200—61.62 |

| | | | |
|---|---|---|---|
| 3,189,375 | 6/1965 | Getman | 292—113 |
| 3,259,412 | 7/1966 | Wheeler | 292—113 |

STEPHEN J. NOVOSAD, Primary Examiner

R. L. WOLFE, Assistant Examiner

U.S. Cl. X.R.

292—66